United States Patent [19]
Deleu

[11] 4,446,875
[45] May 8, 1984

[54] STONE TRAP FOR COMBINE HARVESTERS

[75] Inventor: Walter V. Deleu, Torhout, Belgium

[73] Assignee: Sperry Corporation, New Holland, Pa.

[21] Appl. No.: 502,854

[22] Filed: Jun. 9, 1983

[30] Foreign Application Priority Data

Jun. 15, 1982 [GB] United Kingdom ................. 8217278

[51] Int. Cl.³ ...................... A01F 72/20; A01D 75/18
[52] U.S. Cl. ............................................... 130/27 JT
[58] Field of Search .......................... 130/27 R, 27 JT; 56/10.2, DIG. 15

[56] References Cited

U.S. PATENT DOCUMENTS 3,913,589 10/1975 Rouse et al. ........................ 130/24
3,971,390 7/1976 McDuffie et al. ............... 130/27 JT
4,146,038 3/1979 De Busscher et al. ......... 130/27 JT

FOREIGN PATENT DOCUMENTS 1345846 2/1972 United Kingdom ............ 130/27 JT
1295199 11/1972 United Kingdom ............ 130/27 JT Primary Examiner—Gene Mancene
Assistant Examiner—David I. Tarnoff
Attorney, Agent, or Firm—L. W. Miller; F. A. Seemar

[57] ABSTRACT

A combine harvester including a crop elevator, a threshing mechanism to which in use the crop elevator feeds crop material, and a removable stone trap located between the crop elevator and the threshing mechanism and having an inlet disposed generally at the transition between the crop elevator and the threshing mechanism is disclosed wherein the stone trap is supported in the operative position by a first releasable pivot and is retained in the operative position by a latch, the arrangement being such that on release of the latch the stone trap pivots forwardly of the machine about the first pivot while still being supported by the first pivot, the latter being disengaged on final removal of the stone trap from the machine.

19 Claims, 3 Drawing Figures

STONE TRAP FOR COMBINE HARVESTERS

BACKGROUND OF THE INVENTION

This invention relates to combine harvesters fitted with so-called stone traps which are arranged to receive and retain therein not only stones and rocks but any other hard object which might be entrained in the crop material fed to the threshing mechanism and which would damage the latter if allowed to reach the same.

An ideal position for a stone trap is between the threshing mechanism and the normal crop elevator which feeds crop material to the threshing mechanism from the crop pick-up device. The stone trap thus lies at the transition between the crop elevator and the threshing mechanism but below the plane of that transition which means that it obscures the concave of the threshing mechanism and the grain pan which is disposed beneath the latter, as seen from the front of the machine.

This positioning of the stone trap gives rise to a problem in that if the concave and grain pan require attention while the machine is in the field, the operator can only gain full access by entering from the rear of the machine and crawling over the cleaning sieves of the cleaning mechanism so as to be able to unblock the concave mechanism and/or the grain pan. Such action can be required every couple of hours, for example, when harvesting corn in wet, cold conditions such that the concave mechanism and/or the grain pan can become blocked that frequently. The time taken to effect the necessary unblocking can become significant and in any case, there is operator resistance to crawling into the machine even in dry conditions.

Attempts have been made to meet the problem and there is disclosed, for example, in British Specification No. 1,523,236 a combine harvester having a stone trap disposed in the usual position and having a door which, when opened, allowed easy emptying or cleaning of the stone trap. The stone trap is oriented such that when the door is open, access is provided to the transition area between the crop elevator and the threshing mechanism for clearing any blockage therein which may occur. However, no access is provided to the concave mechanism and/or the grain pan.

In contrast, British Specification No. 1,345,846 discloses a combine harvester having a stone trap which is removable from the front of the machine thus providing access to the concave and grain pan. However, a handling problem arises with this arrangement in that the stone trap is relatively heavy when empty due to its all metal construction and is, therefore, much heavier when full to the extent that it is not easy to handle unless the operator is in a good position. Unfortunately, the operator will not normally be in a good position since he has to stoop or kneel beneath the crop elevator (which is moved to its raised position for this operation), reach upwardly to release the latches retaining the stone trap in position and then lower the trap as well as withdrawing it forwardly of the machine. Thus the operator is not ideally positioned for removal or replacement of the stone trap, particularly when having to bear the weight of a full trap on initial release of the latches and lowering of the trap.

SUMMARY OF THE INVENTION

According to the present invention a combine harvester comprises a crop elevator, a threshing mechanism to which in use the crop elevator feeds crop material, and a removable stone trap located between the crop elevator and the threshing mechanism and having an inlet disposed generally at the transition between the crop elevator and the threshing mechanism, the stone trap being supported in the operative position by first releasable pivot means and being retained in the operative position by latch means, the arrangement being such that on release of the latch means the stone trap pivots forwardly of the machine about the first pivot means while still being supported by the first pivot means, the latter being disengaged on final removal of the stone trap from the machine.

Preferably the first pivot means are located such that the stone trap moves generally downwardly, as well as forwardly, about the first pivot means on release of the latch means. Conveniently, the first pivot means are located both rearwardly and below the stone trap and also below a grain pan, disposed beneath the threshing mechanism and rearwardly of the front edge thereof.

In a preferred embodiment, the first pivot means comprise two first pivot pins spaced apart transversely of the machine and being releasably cooperable with bearing means which respectively locate the pivot pins while permitting rotation thereof. Each first pivot pin is carried on one end of a first arm, the distal end of which is attached to the stone trap via bearing means which receive a second pivot pin, with the first arm connected, via the bearing means, to a second arm. Each second arm is engageable with the stone trap after a predetermined pivotal movement of the latter about the axis of the second pivot pins so as thereafter to rotate with the stone trap and hence rotate the associated first arms to disengage the first pivot pins from their bearing surfaces. Abutment means are provided on the stone trap to engage the respective first arms on return pivotal movement of the stone trap so as to rotate those arms and reengage the first pivot pins with their bearing means.

Second pivot means may be provided to pivotally support the stone trap only when the latter is being moved to or from the operative position. Preferably, the second pivot means comprise two third pivot pins and associated bearing means spaced transversely of the machine with the bearing means attached to the frame of the machine and disposed below the stone trap and spaced from the associated third pivot pin when the stone trap is in the operative position. The third pivot pins engage the respective bearing means on downward movement of the stone trap so as to assist in the support of the latter, the arrangement being such that when the stone trap is removed from the machine it is first supported by, and pivoted about, the first pivot means and also moves downwardly so as to engage the second pivot means about which further pivotal movement is effected, whereby the first pivot means are disengaged. Final removal of the stone trap is effected by disengaging the second pivot means, the removal procedure being reversed on replacement of the stone trap.

BRIEF DESCRIPTION OF THE DRAWINGS

A combine harvester embodying the present invention will now be described in greater detail, by way of example, with reference to the accompanying drawings, in which.

DETAILED DESCRIPTION OF THE PREFERRED EMBODIMENT

Figure 1:
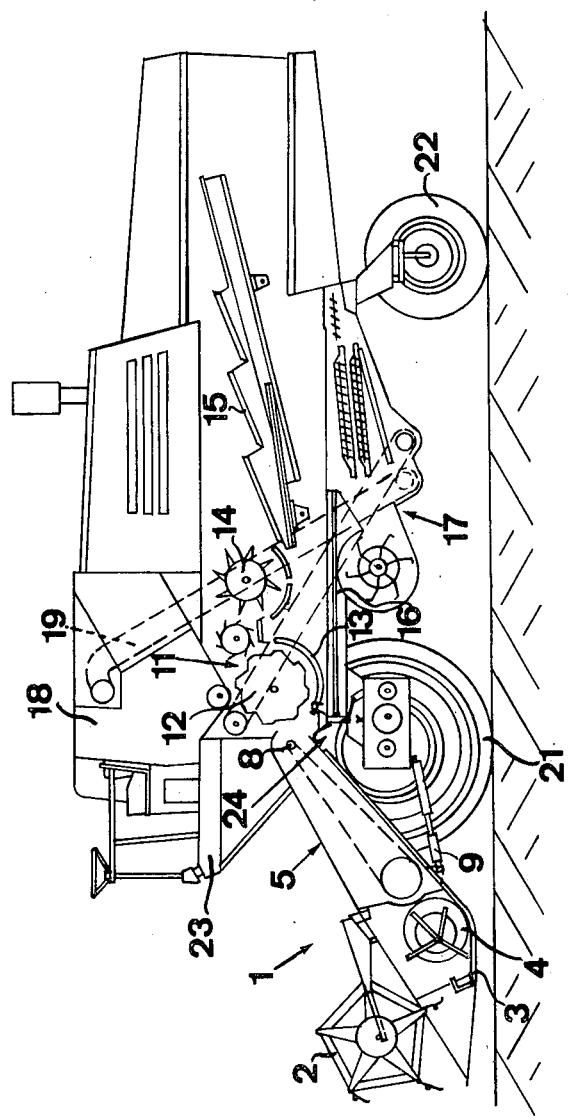
FIG. 1 is a side view of the combine harvester.
Figure 2:
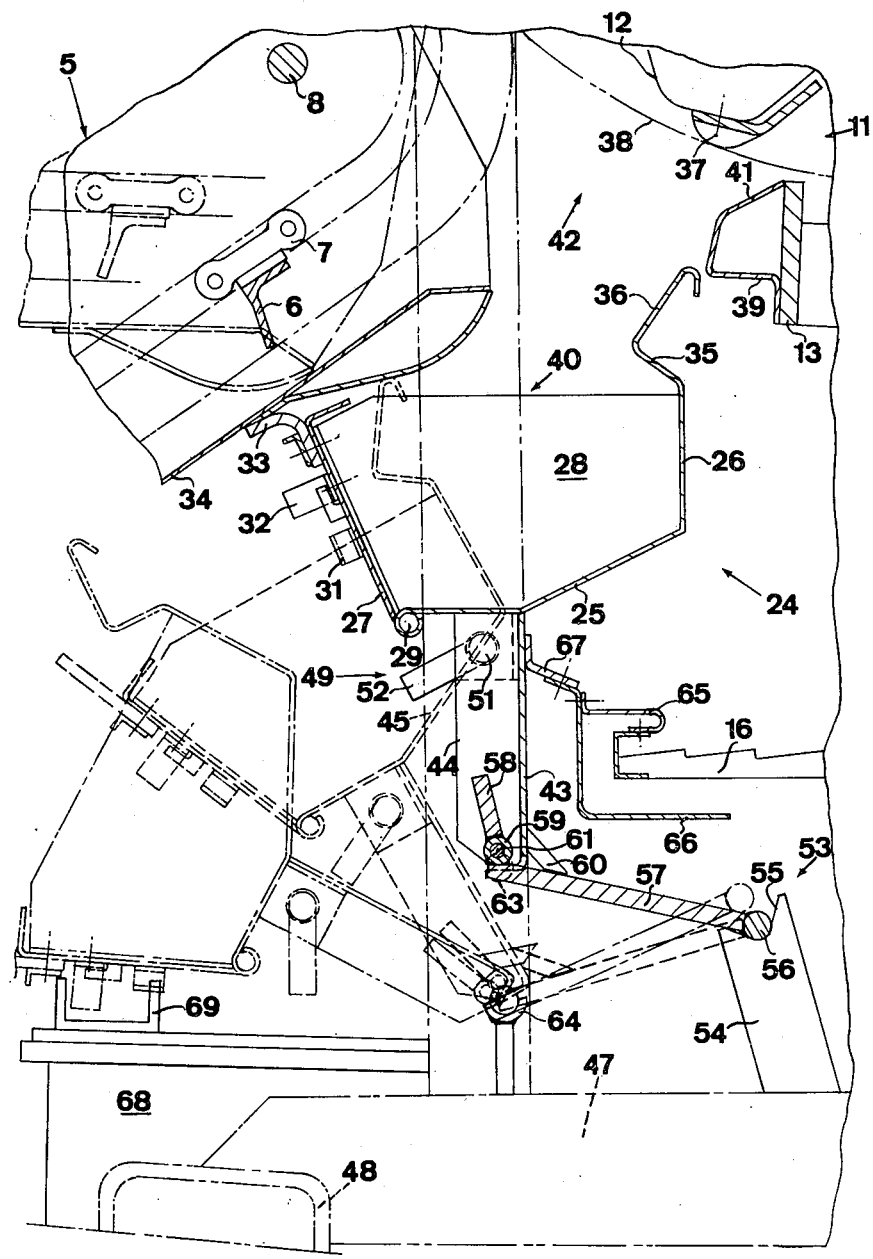
FIG. 2 is an enlargement of a portion of FIG. 1 relating in the main to a stone trap of the machine and showing the stone trap in cross section.

Referring to FIG. 1, the combine harvester is generally conventional and comprises a header 1 embodying a reel 2, a cutterbar 3, an auger 4 which consolidates cut crop centrally of the machine and feeds it to a crop elevator 5 which comprises a chain conveyor having crop conveying elements 6 attached to the links 7 thereof, one link and conveying element being shown in FIG. 2. The header 1 is pivotally mounted at 8 on the chassis or frame of the machine and is raised or lowered about this pivot by a hydraulic ram 9. The machine further comprises a threshing mechanism 11, having a rotor 12 and a concave 13, a separating mechanism 14, straw walkers 15, a grain pan 16, and a cleaning mechanism 17 which receives grain from the grain pan. Clean grain is taken to a grain tank 18 by a grain elevator 19. The machine has a pair of driven front wheels 21, and a pair of rear, steerable wheels 22, the operator controlling the machine from a platform 23.

A stone trap 24 is provided between the crop elevator 5 and the threshing mechanism 11 and will now be described in detail with particular reference to FIGS. 2 and 3. The stone trap comprises a basic container having a base 25, a rear wall 26, a front wall 27, and two side walls 28. The front wall 27 is pivotally attached to the base 25 at 29, whereby it forms a door which can be swung open forwardly of the machine to permit emptying of the trap. A pair of handles 31 is attached to the door 27 and a pair of releasable latches 32 retain the door in the closed position. A flexible strip 33 is secured along the top edge of the door 27 and cooperates with the underside of a floor 34 of the crop elevator 5 to provide a seal between that floor and the front of the stone trap.

The base 25 of the stone trap has a rearwardly and upwardly extending portion which facilitates emptying, and the rear wall 26 has an upper extension 35 which is profiled to present a surface 36 which assists in the smooth flow of crop material from the crop elevator 5 to the threshing mechanism 11, part of the latter being shown in FIG. 2 by way of a rasp bar 37 of the rotor 12 (the rasp bars describing a circle indicated at 38), and the forward end of the concave 13 to which is attached a member 39 also presenting a surface 41 which assists in the flow of crop material to the threshing mechanism. The surfaces 36 and 41 are in general alignment although some offset will occur depending on the spacing of the concave 13 from the rotor 12, which spacing is adjustable, with FIG. 2 showing the concave in the position in which it is closest to the rotor. The top of the stone trap container is open, thus providing an inlet 40 for the stones and other foreign objects, the inlet being generally in the plane of the transition between the crop elevator 5 and the threshing mechanism 11 so that stones, etc. can fall into the stone trap as crop material passes thereover, the rasp bars 37 also serving to propel the stones, etc. into the stone trap as they contact crop material in the general area indicated at 42.

Figure 3:
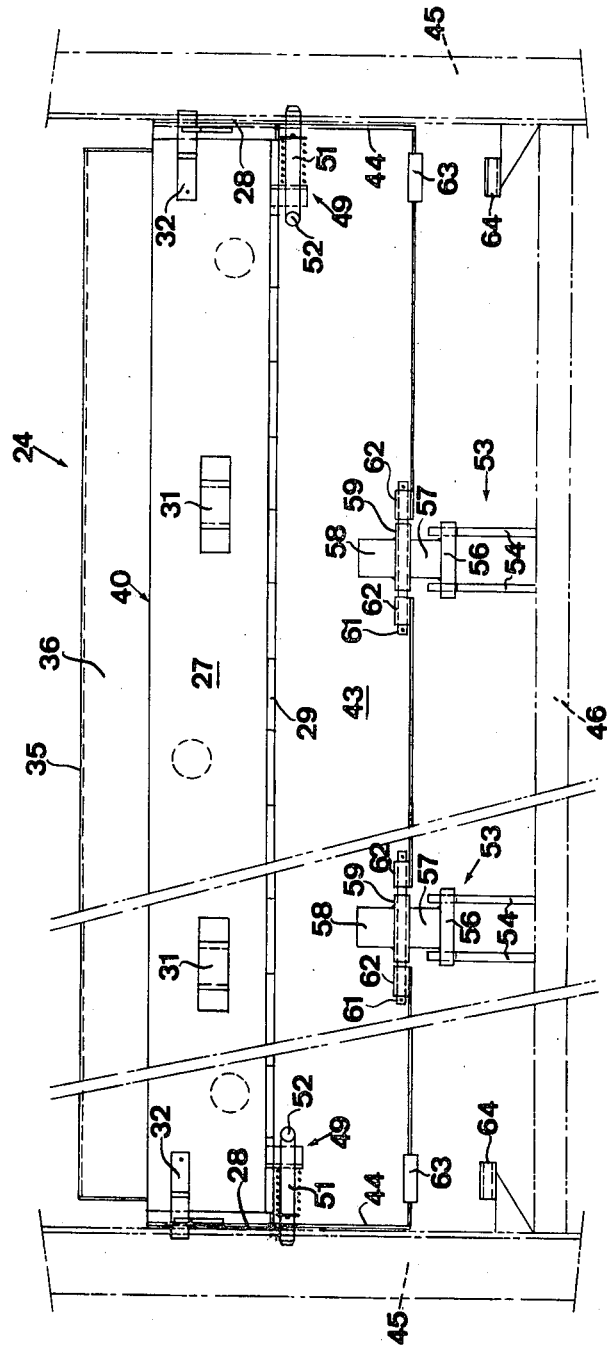
FIG. 3 is a partial front view of FIG. 2.

The stone trap 24 further comprises a downwardly extending panel 43 attached to the underside of the base 25 and formed with a flange 44 at each end, the flanges lying adjacent respective upright beams 45 of the frame of the machine, other frame components indicated in FIGS. 2 and 3 being a transverse beam 46 interconnecting the beams 45, longitudinal beams 47 to which the respective beams 45 are connected, and a further transverse beam 48. Mounted on the panel 43 adjacent each flange 44 is a releasable latch 49 comprising a spring-loaded bolt 51 having a handle 52 attached to one end with the other end being engageable with aligned apertures in the associated flange 44 and beam 45. The two latches 49 serve to retain the stone trap in the operative position but can be released to enable removal of the stone trap when desired.

In the operative position the stone trap is not only supported and retained by the latches 49 but is additionally supported by a pair of releasable pivot means 53 located rearwardly and below the basic stone trap container. Each pivot means 53 is offset inwardly of the adjacent stone trap sidewall 28 and comprises a pivot bearing in the form of a pair of spaced arms 54 extending upwardly and slightly forwardly from the transverse beam 46 and each having a generally V-shaped bearing surface 55 formed in its upper end. A pivot pin or rod 56 engages the bearing surfaces 55 of respective pairs of arms 54 and is rotatable relative thereof, the pivot pin being carried on one end of an arm 57 the distal end of which is rigidly attached to a shorter arm 58 via a bush 59 formed on the lower edge of the panel 43. The arms 57 and 58 define an obtuse angle and each arm 57 is located between the associated pairs of arms 54. A pivot pin 61 extends through the bush 59 and through further bushes 62 formed on the lower edge of the panel 43 on either side of the bush 59. Abutment members 60 (FIG. 2) are fixed to the panel 43 adjacent respective arms 57, each member being engageable with the associated arm.

A further pivot pin or rod 63 is provided on the lower edge of the panel 43 adjacent each side thereof, these pivot pins not being functional while the stone trap is in the operative position as shown in full lines in FIG. 2. However, the pivot pins 63 are capable of being received by respective pivot bearings or bushes 64 disposed therebelow as seen in FIGS. 2 and 3 (full lines) and attached to respective upright beams 45, the bearings being generally hemispherical as seen in side view so as to be able to receive and relinquish the pivot pins, the diametral plane of the open end of each bearing being inclined upwardly and rearwardly of the machine.

FIG. 2 shows the front end of the grain pan 16 which, as is conventional, is reciprocated in use of the machine so as to shake the grain falling thereon from the concave 13 to the rear end of the pan from where it falls to the sieves of the cleaning mechanism 17. A flexible seal or boot 65 extends between the grain pan and a member 66 so as to allow relative movement between the two components while maintaining a seal to prevent grain falling from the front edge of the grain pan. A further seal 67 is fitted to the top edge of the member 66 and extends forwardly for engagement by the rear of the panel 43. Also shown in FIG. 2 is part of a gear box 68 which is provided on the axle of the front driven wheels 21 and provides the power to drive the front wheels, the gear box being connected to engine of the machine by a drive transmission (not shown).

In use of the machine, the stone trap 24 is in the operative (full line) position of FIG. 2 and stones and other objects are received therein through the inlet 40 from the crop material which passes from the crop elevator 5 to the threshing mechanism 11. When the stone trap needs to be emptied, the header 1 is raised to the chain dotted line position of FIG. 2, thereby allowing the operator to approach the front of the stone trap 24. He then releases the latches 32 and opens the door 27 by grasping the handles 31 and pivoting the door downwardly about the pivot 29, thereby exposing the interior of the trap. When emptied, the stone trap is rendered operative again by closing the door 27 and reactivating the latches 32, the header 1 then being lowered to the desired working height.

Should the concave 13 and/or the grain pan 16 become blocked, access thereto is readily gained from the front of the machine by removing the stone trap 24. Removal is effected by first raising the header 1 to the chain dotted line position FIG. 2 so as again to allow the operator to approach the front of the stone trap. The operator then releases the latches 49 on either side of the stone trap by withdrawing the bolts 51 from engagement with the apertures in the respective flanges 44 and upright beams 45, using the handles 52. When the latches 49 have thus been released, the stone trap 24 is free to move but it should be noted that it is still supported on the two pivot means 53 so that the full weight thereof does not have to be borne by the operator. The operator then allows the stone trap 24 to move under its own weight downwardly and forwardly about the common axis of the pivot pins 56, the latter rotating relative to the bearing surfaces 55 on the respective pairs of arms 54. The stone trap 24 eventually reaches a position in which the pivot pins 63 engage the respective pivot bearings 64 and this position is shown in broken lines in FIG. 2. It should be noted that in this position the pivot pins 56 still engage their respective bearing surfaces 55.

The operator next pivots the stone trap further forwardly but this time about the common axis of the pivot pins 63 and about the common axis of the pivot pins 61, these two pivot axes being very nearly coincident. This pivotal movement of the stone trap moves the panel 43 relative to the arms 58 so that at a certain point the arm 58 engage the panel 43, whereupon further pivotal movement of the stone trap serves to rotate the arms 58 and hence rotate the respective arms 57 which are rigidly connected thereto. Rotation of the arms 57 disengages the pivot pins 56 from the respective bearing surfaces 55 and this position is shown in chain dotted lines in FIG. 2. It will be noted that in this position the stone trap 24 conveniently rests on a bracket 69 provided on the gearbox 68, the stone trap still being supported on the pivot bearings 64. Thus, the operator is able to reposition himself, if necessary, to lift the stone trap to effect final removal from the machine which thus disengages the pivot pins 63 from the pivot bearings 64. It will be noted that in the chain dotted position of FIG. 2 the abutment members 60 on the panel 43 have disengaged the respective arms 57.

With the stone trap 24 removed, the operator now has ready access to the concave 13 and grain pan 16 as well as the transition area between the crop elevator 5 and the threshing mechanism 11. When the necessary attention has been given to the components concerned, the stone trap is replaced by first orienting it in the general position shown by the chain dotted lines of FIG. 2 and engaging the pivot pins 63 in the respective pivot bearings 64. The operator then raises the stone trap about the axes of the pivot pins 63 and the pivot pins 61, whereupon at a certain point the panel 43 will disengage the arms 58 but the abutment members 60 will reengage the arms 57 and thus rotate then clockwise (as seen in FIG. 2) until the pivot pins 56 engage the respective bearing surfaces 55. Thus, the stone trap is in the broken line position of FIG. 2, and the final replacement operation is to lift the stone trap further and pivot it about the axis of the pivot pins 56, whereby the pivot pins 63 disengage the pivot bearings 64, the operator manipulating the bolts 51 using the handles 52 so as to reengage the bolts in the respective apertures in the flanges 44 and upright beams 45 to lock the stone trap in the operative position.

It will be appreciated from the foregoing that the removal and replacement of the stone trap 24 is comparatively easy since it is supported at all times except for the final removal operation and the initial replacement operation. Furthermore, the provision of the pivot means 63,64 and the pivot means 53 results in the former ensuring accurate engagement of the latter on replacement of the gearbox, and vice versa on removal, and in the pivot means 63 ensuring accurate repositioning of the stone trap in the operative position so that the main concern of the operator is merely to operate the latches 49 while bearing only a portion of the weight of the stone trap. The fact that the bearing means 55 and 64 face slightly forwardly assists in the release and replacement of the respective pivot pins.

It will be understood that changes in the details, material, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly, as well as in the specific form above.

Having thus described the invention what is claimed is:

1. A combine harvester comprising a threshing mechanism for threshing crop material, a crop elevator operatively associated with said threshing mechanism to feed crop material thereto, and a removable stone trap located between the crop elevator and the threshing mechanism and having an inlet disposed generally at the transition between the crop elevator and the threshing mechanism, the stone trap being pivotally supported in an operative position by first releasable pivot means and being retained in the operative position by latch means, the arrangement being such that on release of the latch means the stone trap can pivot forwardly of the machine about the first pivot means while still being supported by the first pivot means and retained on said combine harvester, said first pivot means including a first pivot pin releasably cooperable with bearing means supported by said combine harvester for positionally locating said first pivot pin while permitting rotation of said first pivot pin, such that said stone trap is pivotally movable about said pivot means and is also removable from said combine harvester by disengagement of said first pivot pin from said bearing means.

2. A combine harvester according to claim 1, wherein the first pivot means are located such that the stone trap moves generally downwardly as well as pivoting forwardly about the first pivot means on release of the latch means.

3. A combine harvester according to claim 2, wherein the first pivot means are located rearwardly and below the stone trap.

4. A combine harvester according to claim 3, wherein a grain pan is provided below the threshing mechanism, and wherein the first pivot means are also located below the grain pan.

5. A combine harvester according to claim 4, wherein the first pivot means are disposed rearwardly of the front edge of the grain pan.

6. A combine harvester according to claim 5, wherein the first pivot means comprises two first pivot pins and respective bearing means spaced transversely of the stone trap.

7. A combine harvester according to claim 5, wherein said bearing means comprises a pair of arms spaced apart transversely of the stone trap and attached at one end of the frame of the machine with the distal end of each arm being provided with a generally V-shaped bearing surface, each pair of bearing surfaces being engageable by the associated first pivot pin.

8. A combine harvester according to claim 5, said first pivot pin is carried on one end of a first arm the distal end of which is attached to the stone trap.

9. A combine harvester according to claim 8, wherein said first arm is connected to a second arm via bearing means provided on the stone trap and which receives a second pivot pin, the second arm being engageable with the stone trap after a predetermined pivotal movement of the stone trap about the axis of the second pivot pin so as thereafter to rotate with the stone trap and hence rotate the associated first arm to disengage the corresponding first pivot from its bearing surface, abutment means being provided on the stone trap to engage the first arm on return pivotal movement of the stone trap so as to rotate that arm and reengage the associated first pivot in its bearing surface.

10. A combine harvester according to claim 9, wherein the bearing means disposed between the first arm and the associated second arm are provided on an extension of the stone trap, together with the abutment means, and the second arm is engageable with that extension.

11. A combine harvester according to claim 10, wherein said extension extends downwardly from the stone trap.

12. A combine harvester according to claim 2, wherein second pivot means are provided which are operable pivotally to support the stone trap only when the latter is being moved to and/or from the operative position.

13. A combine harvester according to claim 12, wherein the second pivot means comprise a thitd pivot pin provided on the stone trap, and bearing means attached to the frame of the machine and disposed below the stone trap and spaced from the third pivot pin when the stone trap is in the operative position, the third pivot pin engaging the associated bearing means on downward movement of the stone trap so as to assist in the support of the stone trap, the arrangement being such that when the stone trap is removed from the machine it is first supported by, and pivoted about, the first pivot means and also moves downwardly so as to engage the second pivot means about which further pivotal movement is affected, whereby the first pivot means are disengaged, and final removal is effected by disengaging the second pivot means, this procedure being reversed on replacement of the stone trap.

14. A combine harvester according to claim 13, wherein two third pivot pins are provided with respective bearing means spaced apart transversely of the machine.

15. A combine harvester according to claim 13, wherein each bearing means associated with a third pivot comprises a hemispherical bush mounted on the machine frame with the diametrical plane of the open end of the bush being inclined upwardly and rearwardly of the machine to facilitate engagement and disengagement of the associated third pivot pin.

16. A combine harvester according to claim 13, wherein sealing means are provided between the tone trap and the grain pan.

17. A combine harvester according to claim 13, wherein the stone trap is provided with a door facing forwardly of the machine and sealing means are provided between the door and the floor of the crop elevator.

18. A combine harvester according to claim 13, wherein the stone trap has a rear wall the upper edge of which is extended and profiled to provide a surface which assists in the smooth flow of crop material from the crop elevator to the threshing mechanism over the stone trap.

19. A combine harvester according to claim 18, wherein the threshing mechanism comprises a concave having its forward edge adjacent the rear wall of the stone trap and fitted with a member which also provides a surface to assist in said smooth flow of crop material.

* * * * *